June 30, 1970  NOBORU AMANO ET AL  3,518,539
TIME ANALYZERS FOR COUNTING-RATE CHANGE MEASUREMENT
Filed June 26, 1967  3 Sheets-Sheet 1
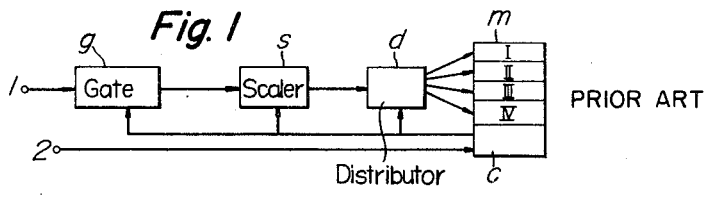
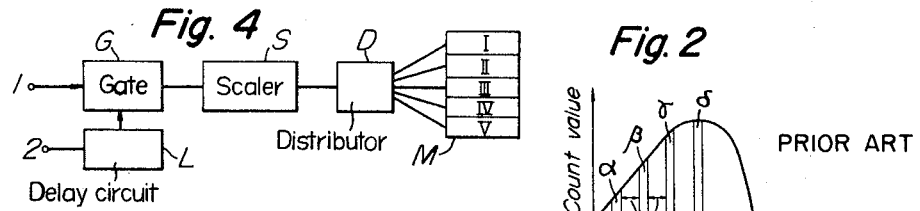
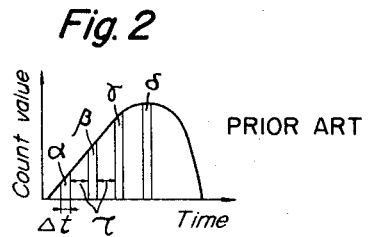
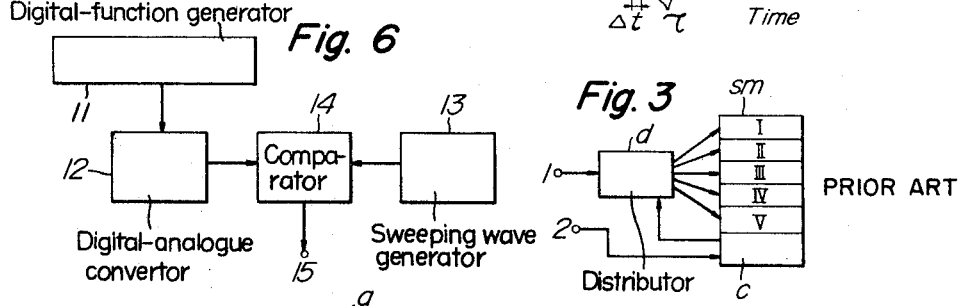
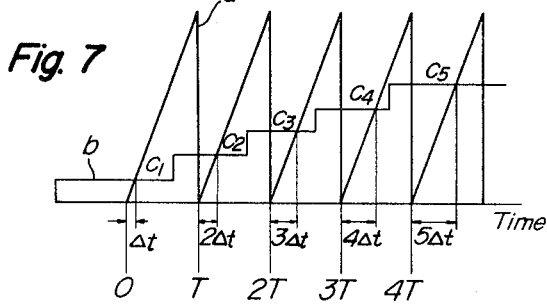
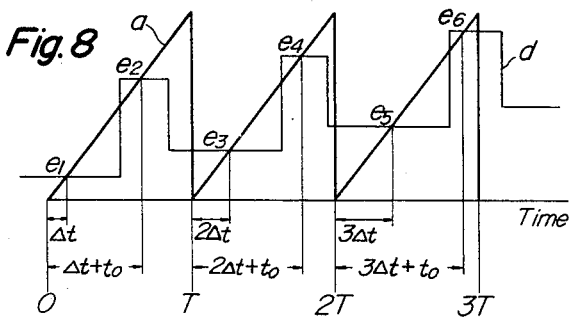
Inventors
Noboru Amano
Hirotaka Sasaki
By Stevens, Davis, Miller & Mosher
ATTORNEYS

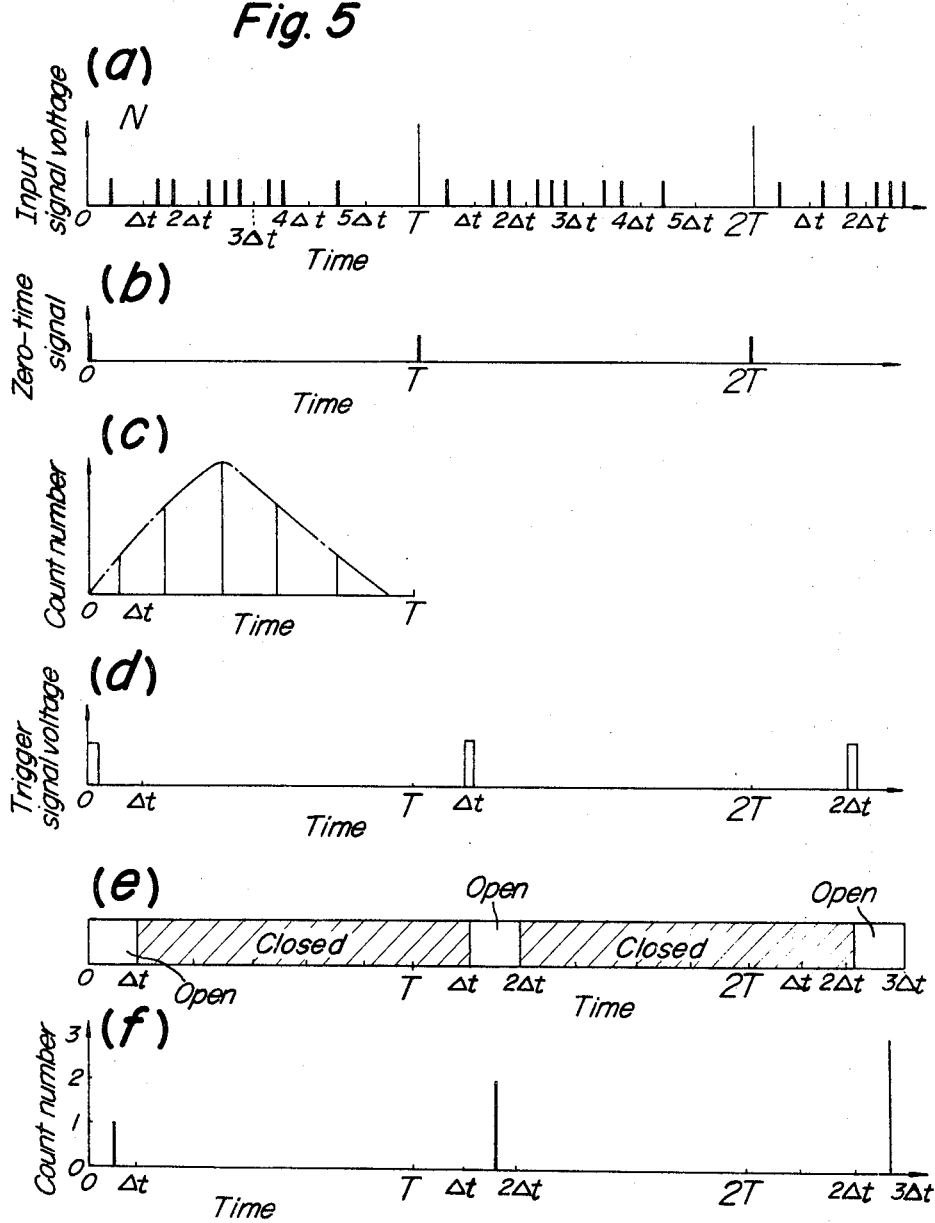

United States Patent Office 3,518,539
Patented June 30, 1970

3,518,539
TIME ANALYZERS FOR COUNTING-RATE
CHANGE MEASUREMENT
Noboru Amano, Mito-shi, and Hirotaka Sasaki, Hirakata-shi, Japan, assignors to Japan Atomic Energy Research Institute, Tokyo, Japan, and Matsushita Electric Industrial Co., Ltd., Osaka, Japan, both corporations of Japan
Continuation-in-part of application Ser. No. 355,326, Mar. 27, 1964. This application June 26, 1967, Ser. No. 648,855
Int. Cl. G01r 23/16, 27/02
U.S. Cl. 324—77          5 Claims

ABSTRACT OF THE DISCLOSURE

A time analyzer for counting-rate change measurement including a delay circuit for delaying, by different time lengths for successive repetitions, zero time signals which are repeatedly produced in synchronism with the start of each repetition of sequential phenomena to be measured, a gate circuit triggered by the output of the delay circuit for passing input signals therethrough during a constant channel time width, a high-speed scaler circuit for counting the input signals that pass through the gate and correspond to the phenomena to be measured, and a memory device having a plurality of addresses for storing the count of the input signals for respective time intervals in respective addresses corresponding to channels on the time axis and determined by the triggering of the gate circuit.

---

The present application is a continuation in part of our copending application Ser. No. 355,326, filed Mar. 27, 1964, and now abandoned.

This invention realtes to time analyzers for counting-rate change measurement and more particularly to time analyzers adapted for use when the counting rate changes at high speeds.

Known time analyzers are not suitable for following high-speed counting-rate changes such as for measuring diffusion constants in subcritical nuclear assemblies by means of a pulsed neutron method. The primary object of the present invention is to provide a time analyzer of the type specified, which is of relatively simple construction, to measure high-speed variation schemes of counting rates in recurrent phenomena by sampling a part of the change.

Another object of the present invention is to provide a time analyzer of the type specified which has substantially no dead time in measurement.

A further object of the present invention is to provide a time analyzer of the type specified with conciseness and increased reliability as well as low cost.

A still further object of the present invention is to provide a time analyzer of the type specified in which sampling time may be readily changed in both length and repetition rate.

The means for accomplishing the foregoing objects and other advantages, which will be apparent to those skilled in the art, are set forth in the following specification and claims and are illustrated in the accompanying drawings dealing with a basic embodiment of the present invention. Reference is made now to the drawings in which:

FIG. 1 is a block diagram of a known time analyzer;

FIG. 2 is a graphic illustration of the operation of the known time analyzer shown in FIG. 1;

FIG. 3 is a block diagram of another example of a known time analyzer;

FIG. 4 is a block diagram showing an embodiment of the present invention;

FIG. 5 shows the wave forms and time relationship for the operation of the time analyzer of the present invention as shown in FIG. 4;

FIG. 6 is a block diagram of the delay circuit shown in FIG. 4;

FIG. 7 shows the wave forms for explaining a mode of operation of the apparatus shown in FIG. 6;

FIG. 8 shows the wave forms for explaining another operation of the apparatus shown in FIG. 6.

Figure 9:
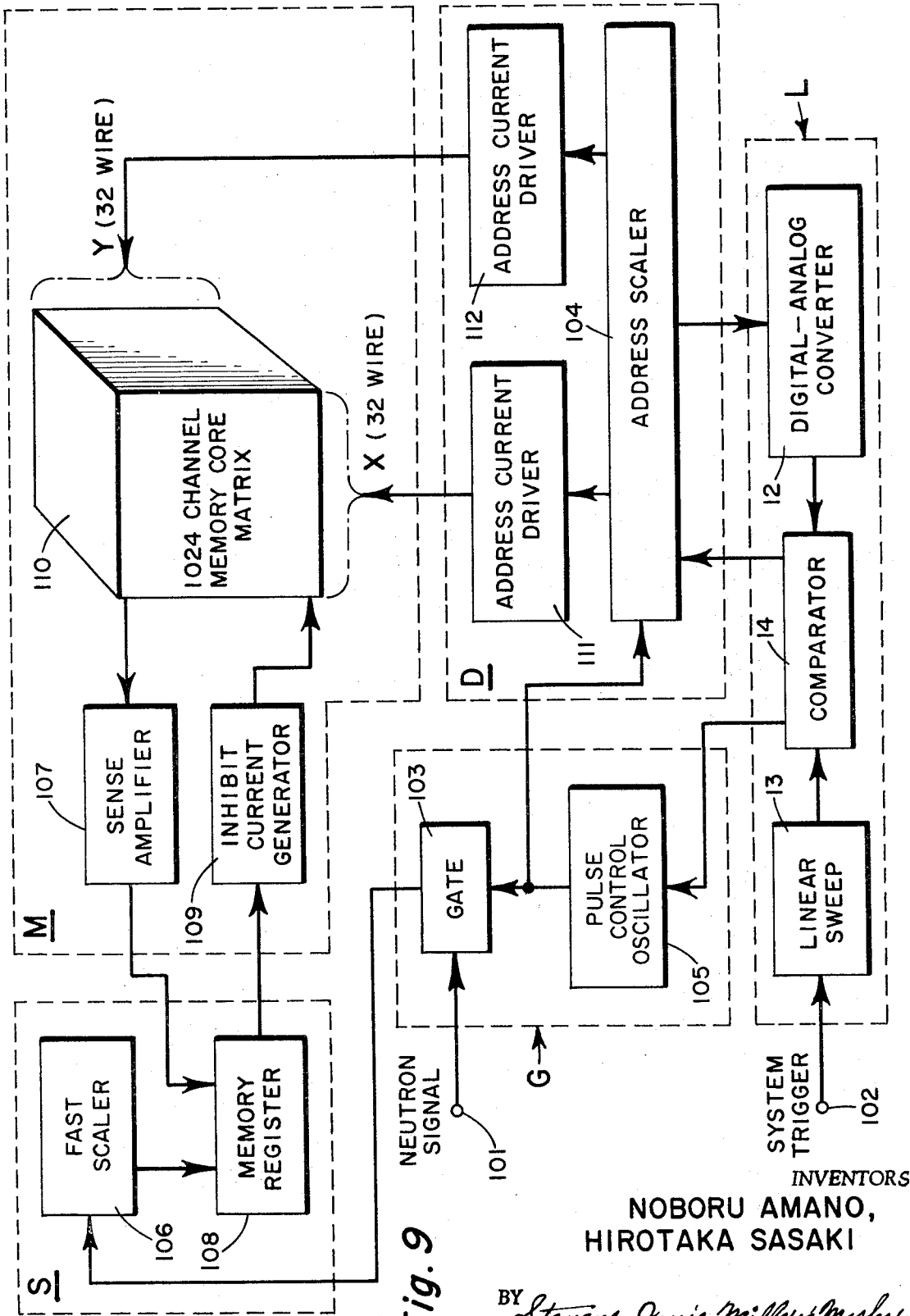
FIG. 9 is a more detailed block diagram of the invention as shown in FIG. 4.

An example of a known time analyzer has been shown in FIG. 1. Neutron-detecting signals are supplied to an input terminal 1, from which the signals pass through a signal gate $g$ to a high-speed scaler $s$ in which the signals are counted. The count value of the scaler $s$, during a definite and minute time interval, is passed through a distributor $d$ to a predetermined address of memory device $m$ and is stored therein. The memory device $m$ is associated with a control portion $c$ which receives zero-time signals from an input terminal 2 to start time-analyzing operations. Thus, the control portion $c$ serves to control the whole system. In such a system, neutron-detecting signals from input terminal 1 pass through the gate $g$ during a definite time interval $\Delta t$ and then the gate is subsequently closed. The neutron-detecting signals thus having passed through the gate are counted by the scaler $s$ and the counted value is passed through the distributor $d$ and stored at a predetermined address of the memory device $m$.

The above-mentioned storing operation is effected during a time during which the gate $g$ is closed. Upon termination of the storing operation, the gate $g$ is opened and neutron-detecting signals are again detected. The count value obtained during the first counting period is shown by $\alpha$ in FIG. 2. The count obtained during the second and subsequent counting periods are shown by $\beta$ and $\gamma$, etc. The time distribution of the neutron counting rates are thus measured at constant time intervals from the zero point. The interval of the sampling is determined by the time needed for reading out and writing in or the memory cycle time of the memory device. The time interval during which the sampling is not effected is dead time. This is somewhat of a disadvantage since an abrupt change taking place during dead time cannot be measured.

According to the above method, a dead time is required during which the gate is closed in order to effect the storing operation. In the case when such time intervals $\tau$ (see FIG. 2) are long in comparison with the phenomena changes, it is impossible to follow any high-speed counting-rate changes.

The system shown in FIG. 3 contemplates elimination of the above-mentioned default of the known system shown in FIG. 1. In this system, a group $sm$ of a number of high-speed scalers I, II, III, IV, V, . . . connected in parallel, receive neutron-detecting signals through a distributor $d$. The high-speed scalers are also provided with memorizing functions, and the distributor $d$ serves to cause the scalers to count the neutron-detecting signals during predetermined time intervals $\Delta t$ once for each scaler.

According to this second known system, dead-time intervals for counting are only those required for the switching operation of the distributor and consequently are extremely short, thus making it possible to follow high-speed counting-rate changes. However, it is necessary to provide a large number of high-speed scalers, and in addition, these high-speed scalers must serve as memory devices. Consequently, the group of high-speed scalers $sm$ must be of a significantly large number, resulting in a large size of the apparatus and a low reliability thereof.

The present invention provides time analyzers for the above-mentioned purposes but without having the defects described above in connection with the known devices.

The present invention will now be described with reference to FIG. 4 showing one embodiment of the invention. The system comprises an input terminal 1 receiving neutron-detecting signals. Another input terminal 2 receives zero-time signal pulses which are generated simultaneously with a start of time-analyzing operations. A delay circuit L is provided for successively increasing time delays according to the number of repetitions of zero-time signals. A gate circuit G is triggered and opened by the output pulses of the delay circuit L to pass the neutron-detecting signals from the input terminal 1 during short time intervals $\Delta t$ only. A high-speed scaler S counts the neutron-detecting signal series that have passed during the $\Delta t$ time period, and a distributor D distributes and passes the counted values onto respective addresses of the memory device, to be described later, according to the number of repetitions of the phenomena. The memory device above referred to is provided with a plurality of memory addresses I, II, III, IV, V, . . . .

In the apparatus shown in FIG. 4, let it be assumed that the repeated pulse series, as shown in FIG. 5a, are applied to the input terminal 1. The repeated pulse series may, for example, be a pulse series obtained by detecting thermal neutrons by a neutron detecting means, not shown, such thermal neutrons being produced by moderation of fast neutron bursts with a constant repetition rate. Prior to the above, the first zero-time signal (FIG. 5b) is supplied to the input terminal 2. The delay time of the delay circuit L for the first zero-time signal pulse is zero, and a triggering signal (FIG. 5d) is instantly sent to the gate circuit G. Thereupon, the gate circuit is opened and held open during a time interval from 0 to $\Delta t$ (FIG. 5e) to pass the input signal. The signal having passed through the gate circuit G is counted by the scaler S (FIG. 5f) and the count number (one) is entered into the memory device M through the distributor D and stored in the address I. In doing this, the time proceeds from 0 to T at which time the second zero-time pulse is supplied to the delay circuit L which gives $\Delta t$ delay to the second zero-time pulse (FIG. 5d). The delayed second zero-time pulse triggers the gate circuit G (FIG. 5e), which opens and passes the input signal therethrough during the time interval from $(T+\Delta t)$ to $(T+2\Delta t)$. Then, the scaler S counts two pulses during the time interval from $T+\Delta t$ to $T+2\Delta t$, as shown in FIG. 5a, and provides the count number (two), as shown in FIG. 5f, which is stored in the address II of the memory device M through the distributor D.

Similarly, for the third time period, the count number (three) is stored in the address III of the memory device M during the time interval from $2T+2\Delta t$ to $2T-3\Delta t$, as is readily understood from FIGS. 5a and 5f. The following count numbers (two, one . . .) are stored in the address IV, V, . . . of memory device M, respectively, in a similar manner, and time distribution of the count numbers is obtained in the memory device M, as shown in FIG. 5c. After the above-described operation has proceeded to the time of a predetermined maximum time, the time delays of zero, $\Delta t$, $2\Delta t$, $3\Delta t$, $4\Delta t$, $5\Delta t$ . . . are repeated in the order mentioned, and the input count numbers are respectively stored in the addresses I, II, III, IV, V, . . . of memory device M in addition to those numbers previously stored therein so that the result of the measurement is at least a statistical evaluation of increased precision.

In contrast to the previously described disadvantage of dead time in the prior-art devices, in the present invention the sampling is effected throughout the entire measuring time, beginning from zero time, by successively delaying the timing of the sampling relative to each repeatedly generated zero-time signal, as illustrated in FIG. 5. Therefore, the present invention will measure even detailed time variations.

The delay circuit L, shown in FIG. 4, is shown in somewhat greater detail in FIG. 6. The delay circuit comprises a digital-function generating circuit 11, a digital-analogue converting circuit 12 for producing a step-wise wave (as shown by curve $b$ in FIG. 7) from the output of the digital-function generating circuit 11, a linear sweep voltage generator 13 for producing a saw-tooth wave $a$ (as shown in FIG. 7), and a comparator circuit 14 for comparing the outputs of digital-analogue converter 12 and sweep voltage generator 13 with each other for providing time signals at the output terminal 15, corresponding to delay times $\Delta t$, $2\Delta t$, $3\Delta t$, $4\Delta t$, $5\Delta t$, . . . from the start points 0, T, 2T, 3T, 4T, . . . of respective cycles of the saw-tooth wave, at the time points $C_1$, $C_2$, $C_3$, $C_4$, $C_5$ . . . of the voltage coincidence of waves $a$ and $b$, respectively.

In the delay circuit shown in FIG. 6, the digital-function generator 11 produces a predetermined function signal for producing a stepwise wave $b$, shown in FIG. 7, by means of the digital-analogue converter 12, which wave is compared with a saw-tooth wave for producing successively increased delay signals. However, the delay circuit may operate in another manner, as shown in FIG. 8. In this case, the digital-analogue converted 12 is designed to generate a gradually rising rugged wave, as shown by curve $d$ in FIG. 8. Consequently, the output signals from the comparator 14 are produced at times $e_1$, $e_2$, $e_3$, $e_4$, $e_5$, $e_6$ . . ., etc. That is to say, output signals from the comparator 14 are produced twice per sweeping of wave $a$, the output of the sweep voltage generator 13. Moreover, these output signals occur in pairs, with a constant time interval $t_0$ therebetween, for each cycle of wave $a$, and with successively increasing time delays $\Delta t$, $2\Delta t$, $3\Delta t$, $4\Delta t$, $5\Delta t$, . . . between the output signal pairs.

Referring now to FIG. 9, repeated pulse trains, such as shown in FIG. 5a (for example, those pulses trains which are obtained by detecting, with neutron detecting means, the thermal neutrons produced by moderating fast neutrons which have burst with a constant repetition rate) are applied to the input terminal 101. In synchronism with the commencement of this signal, a zero-time signal, as shown in FIG. 5b, is supplied to the input terminal 102. The timing for opening the gate 103 for passing the pulse signal which is to be determined and which is applied from the terminal 101 in response to the zero-time signal is determined as follows:

In synchronism with the zero-time signal produced at the terminal 102, a linear sweep voltage generator 13 generates sweep voltage $a$, as shown in FIG. 7. Now, the illustrated apparatus is operative in such manner: that the repeated signal having a cycle T is divided into time intervals of $2^{10}$ or 1024 pieces; that the number of pulses arriving during each time interval are counted; and that this count is stored in each address of the 1024 channel magnetic memory core matrix corresponding to each time interval. The address scaler 104, for determining the address to store the count, generates digital signals from 1 to 1024, corresponding to the addresses, and these digital signals are supplied to the digital-analogue converter 12. The digital-analogue converter 12 generates analogue signals corresponding to the addresses and the output [(b) in FIG. 7] of the digital-analogue converter is compared with the output of the linear sweep-voltage generator 13 by the comparator 14. At a time where both outputs coincide, the comparator generates an output signal which triggers the pulse control oscillator 105 to generate pulses at constant intervals $\Delta t$ and to open the gate 103 for only the time length of $\Delta t$. More specifically, the gate 103 is always open for the time interval $\Delta t$ and its timing is shifted by the length of $\Delta t$ for each time of the repeated cycles T of the signals.

In a particular cycle of the input signals, a digital output, corresponding to a particular channel complying with the time at which the count is to be made, is applied to the digital-analogue converter 12 and the gate 103 is opened at the time which corresponds to the channel. For example, in the first cycle of the input signal, the output from the address scaler 104 corresponding to the channel "1" is zero and the comparator 14 generates an output simultaneously with the commencement of the sweep of the linear sweep voltage generator 13. The gate 103 is opened during the period of from zero time to $\Delta t$. The pulses which have passed the gate 103 are counted by the scaler 106. At this time, the contents stored in that particular channel have been read out and stored, through the sense amplifier 107, in the memory register 108. This stored memory is added with the count for the particular cycle which has been counted by the scaler 106 and triggers the inhibit current generator 109. The added value is stored in the corresponding address in the magnetic core matrix 110.

Next, the output of the comparator 14 causes the address scaler 104 to proceed by $2N+1$ steps. To prepare for the sampling of the next cycle, the content of the memory of the next address is read out and stored in the memory register 108. At the same time, the address scaler 104 is caused to generate a digital signal which corresponds to the next address. Upon the arrival of the next zero-time signal, the delay circuit L will operate with a delay of $\Delta t$. In the next cycle, the gate 103 opens after a delay of $\Delta t$ with respect to the preceding cycle, and the number of pulses for this interval of time is counted. The foregoing operation is then repeated.

In the addresses, corresponding to the respective time intervals of the individual channels, the number of the pulses that have arrived during respective time intervals are additively stored. The address current drivers 111 and 112 supply current to predetermined lines in the X and Y axes of the magnetic core matrix 110, respectively, in compliance with the content of the address scaler 114 to read out the content.

The function of the distributor D is to distribute successively arriving input signals to the corresponding addresses of the memory device M in accordance with arrival times. In operation, the first address is first specified and the value stored in the first address is entered into the memory register 108. At this time, the address scaler 104 generates a digital signal corresponding to the specified address (first address). The digital signal is converted into an analogue signal by the converter 12 and compared with a sweep voltage which commences synchronously with the zero-time signal in the comparator 14 to generate, at time (0) corresponding to the first address, a signal to trigger the pulse control oscillator 105 to open the gate 103 during the time 0 to $\Delta t$, corresponding to the first address.

The signals coming in through input 101 and gate 103 are counted by the fast scaler 106 and the count is added to the count accumulated by the last time in the memory register 108. The updated count in the memory register 108 is written in the first address of the core matrix 110. Thus, one distribution operation is completed.

The address scaler 104 is a binary counting circuit of 10 bits which are divided into two parts, each consisting of 5 bits. Each of the respective 32 outputs (5 bits) is determined by diode matrix in accordance with the content of the address scaler 104. These outputs constitute horizontal and vertical inputs of the core matrix 110, the intersection thereof being the specified address.

According to the present invention, as has been made clear from the above explanation of an embodiment of the invention, a digital-analogue converter is employed for generating any desired wave form to compare the same with a sweep voltage so that special sampling is possible for sampling each cycle of phenomenon to be measured several times as desired. In addition, by controlling the digital signal applied to the digital-analogue converter, or by suitably selecting the conversion function of the digital-analogue converter, the sampling times may be selected in any desired functional relation, for example, to give logarithmic delays in the sampling times.

It has clearly been understood that the new time analyzer has no dead-time period in the counting operation because the phenomenon is sampled (counted) at different times for each cycle of repetition and stored in the respective addresses of the memory device. Consequently, any high-speed counting-rate changes of the phenomena can be measured by the apparatus of the present invention.

The present invention does not require the provision of a large group of high-speed counters which include a memory function, as is the case of the conventional system as shown and described in relation to FIG. 3. The invention merely requires the provision of a large number of addresses in a memory device so that the apparatus as a whole can be of a relatively small size, of simple construction, and have high reliability with low cost.

In addition, according to the present invention, the sampling time $\Delta t$ may readily be changed in its length, and the time analyzing can be effected either continually, as in the embodiment illustrated, or intermittently by such an appropriate modification as may be obvious to those skilled in the art but not described herein.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description and all changes which come within the meaning and range of equivalency of the claims are therefore to be embraced therein.

What is claimed is:

1. A device for measuring high-speed variations in counting-rates for recurrent phenomena signals being measured comprising: means for generating zero-time signals; a delay circuit receiving said zero-time signals and imparting thereto successively increasing delays; a gate circuit operatively connected to receive input signals to be measured, said gate circuit being triggered by the output of said delay circuit to pass said input signals; scaler means for counting said input signals passing through said gate circuit for the time intervals when said gate circuit is open; and a memory device having a plurality of addresses and adapted to store the counts of the input signals counted by said scaler.

2. A device according to claim 1 wherein said zero-time signals are generated in synchronism with the commencement of a repetitive phenomenon signal to be measured.

3. A device according to claim 1 wherein said delay circuit comprises: a digital-function generating circuit; a digital-analogue converter circuit operatively connected to the output of said digital-function generating circuit; a linear sweep voltage generator; and a comparator circuit for comparing the output of said digital-analogue converter circuit with the output of said linear sweep voltage generator to generate an output.

4. A device for measuring high-speed variations in counting-rates for recurrent phenomena signals being measured comprising: a source of signals to be measured; a source of zero-time signals produced in synchronism with the start of the signals to be measured; a delay circuit receiving and delaying said zero-time signals by different time lengths for each successive repetition of signals being measured; a gate cricuit connected to said delay circuit and being triggered thereby to pass said signals to be measured; a high-speed scaler circuit operatively connected to count the signals passing said gate circuit, the count corresponding to said phenomena to be measured; and a memory device having a plurality of addresses for storing therein the count of said scaler for respective times in respective addresses corresponding to the time axis determined by said triggerings, said delay circuit comprising a digital-function generating circuit; a digital-analogue converting circuit for converting the output of said digital-function circuit into analog signals, a sweep voltage generator circuit, and a comparator circuit for comparing the outputs of said digital-analogue converting circuit and said sweep voltage generator with each other to produce its output.

5. A time analyzer for counting rate-changes of recurrent phenomena signals comprising: a source of signals to be measured; a source of zero-time signals repeatedly produced in synchronism with each starting of repetitions of signals to be measured; a delay circuit for delaying said zero-time signals by different time lengths for each successive repetition of the signals to be measured, a gate circuit triggered by an output signal from said delay circuit, said output signal having a constant time duration, a high-speed scaler circuit for counting input signals that have passed through said gate circuit during the triggering thereof, and a memory device having a plurality of addresses for storing therein the count of said scaler for respective times in respective addresses corresponding to the time axis determined by said triggerings.

References Cited
UNITED STATES PATENTS

| | | |
|---|---|---|
| 2,733,358 | 1/1956 | Carapellotti. |
| 2,804,606 | 8/1957 | Reaves. |
| 2,951,181 | 8/1960 | Sugarman. |
| 3,270,205 | 8/1966 | Ladd et al. |
| 3,317,832 | 5/1967 | Webb. |
| 3,360,723 | 12/1967 | Reaves. |

E. E. KUBASIEWICZ, Primary Examiner

U.S. Cl. X.R.

324—68